US009966024B2

(12) United States Patent
Inada et al.

(10) Patent No.: US 9,966,024 B2
(45) Date of Patent: May 8, 2018

(54) LIQUID CRYSTAL DISPLAY DEVICE AND METHOD FOR DRIVING SAME

(71) Applicant: Sharp Kabushiki Kaisha, Osaka-shi, Osaka (JP)

(72) Inventors: Ken Inada, Osaka (JP); Taketoshi Nakano, Osaka (JP); Asahi Yamato, Osaka (JP); Akizumi Fujioka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 492 days.

(21) Appl. No.: 14/421,171

(22) PCT Filed: Aug. 22, 2013

(86) PCT No.: PCT/JP2013/072351
§ 371 (c)(1),
(2) Date: Feb. 12, 2015

(87) PCT Pub. No.: WO2014/038380
PCT Pub. Date: Mar. 13, 2014

(65) Prior Publication Data
US 2015/0206486 A1 Jul. 23, 2015

(30) Foreign Application Priority Data
Sep. 4, 2012 (JP) ................. 2012-194226

(51) Int. Cl.
*G09G 5/10* (2006.01)
*G09G 3/36* (2006.01)
*G02F 1/1368* (2006.01)

(52) U.S. Cl.
CPC ......... *G09G 3/3614* (2013.01); *G02F 1/1368* (2013.01); *G09G 3/3648* (2013.01);
(Continued)

(58) Field of Classification Search
CPC ...... G09G 3/3614; G09G 3/3696; G09G 5/06; G09G 2320/0247; G09G 2320/0271;
(Continued)

(56) References Cited
U.S. PATENT DOCUMENTS

2010/0231617 A1* 9/2010 Ueda .................... G09G 3/3648
345/690
2011/0205254 A1* 8/2011 Umezaki ............. G09G 3/3648
345/690
2012/0268504 A1* 10/2012 Irie ...................... G09G 3/3614
345/690

FOREIGN PATENT DOCUMENTS

JP 2008-164852 A 7/2008
JP 2009-037075 A 2/2009
(Continued)

OTHER PUBLICATIONS

Official Communication issued in International Patent Application No. PCT/JP2013/072351, dated Oct. 29, 2013.

*Primary Examiner* — Amr Awad
*Assistant Examiner* — Aaron Midkiff
(74) *Attorney, Agent, or Firm* — Keating & Bennett, LLP

(57) ABSTRACT

The occurrence of flicker is effectively suppressed particularly in a liquid crystal display device that performs low-frequency driving.
Provided are a gradation-to-voltage value conversion table for converting a gradation to a voltage value, a correction value map for storing a correction value, and a voltage value-to-gradation conversion table for converting a voltage value to a gradation. A gradation of an input image signal is converted to a first voltage value, using the gradation-to-voltage value conversion table. The correction value specified in accordance with a location of a pixel to be processed is added to or subtracted from the first voltage value so that a second voltage value is obtained. The second voltage value
(Continued)

is converted to an output gradation, using the voltage value-to-gradation conversion table. A driving video signal is applied to a source bus line, based on the output gradation.

11 Claims, 11 Drawing Sheets

(52) U.S. Cl.
CPC ... *G09G 3/3696* (2013.01); *G09G 2320/0247* (2013.01); *G09G 2320/0271* (2013.01); *G09G 2330/021* (2013.01); *G09G 2340/0435* (2013.01)

(58) Field of Classification Search
CPC ... G09G 2320/0276; G09G 2320/0285; G09G 3/3648; G09G 2330/021; G09G 2340/0435; H04N 1/6019; G02F 1/1368
USPC .......................................... 345/690, 601, 602
See application file for complete search history.

(56) References Cited

FOREIGN PATENT DOCUMENTS

| | | |
|---|---|---|
| JP | 2011-191746 A | 9/2011 |
| WO | 2009/060656 A1 | 5/2009 |
| WO | 2011/065063 A1 | 6/2011 |

\* cited by examiner

Fig.4

| GRADATION | VOLTAGE VALUE |
|---|---|
| 0 | 0 |
| 1 | 5 |
| 2 | 9 | ←—51
| 3 | 13 |
| ⋮ | ⋮ |
| 254 | 1010 |
| 255 | 1023 |

Fig.5

| | | WIDTHWISE ADDRESS | | | | | | | |
|---|---|---|---|---|---|---|---|---|---|
| | | 0 | 1 | 2 | 3 | 4 | 5 | ⋯ 1022 | 1023 |
| LENGTHWISE ADDRESS | 0 | −5 | −4 | −4 | −3 | −3 | −2 | ⋯ −7 | −8 |
| | 1 | −4 | −4 | −2 | 0 | 0 | 0 | ⋯ −6 | −7 |
| | 2 | −4 | −3 | 0 | 1 | 1 | 1 | ⋯ −5 | −6 |
| | 3 | −3 | −3 | 0 | 1 | 1 | 1 | ⋯ −1 | −3 |
| | 4 | −3 | −2 | 1 | 2 | 2 | 1 | ⋯ −1 | −3 |
| | 5 | −3 | −1 | 1 | 2 | 3 | 2 | ⋯ −1 | −3 |
| | ⋮ | ⋮ | ⋮ | ⋮ | ⋮ | ⋮ | ⋮ | ⋯ ⋮ | ⋮ |
| | 766 | −5 | −4 | −2 | −1 | −1 | −1 | ⋯ −7 | −8 |
| | 767 | −6 | −5 | −3 | −1 | −1 | −1 | ⋯ −8 | −9 |

Fig.6

| VOLTAGE VALUE | GRADATION |
|---|---|
| 0 | 0 |
| 1 | 1 |
| 2 | 1 |
| 3 | 1 |
| ⋮ | ⋮ |
| 1022 | 255 |
| 1023 | 255 |

START
↓
S10 CONVERT GRADATION TO VOLTAGE VALUE
↓
S20 CORRECT VOLTAGE VALUE
↓
S30 CONVERT VOLTAGE VALUE TO GRADATION
↓
END

DISPLAY PART

| VOLTAGE VALUE | GRADATION |
|---|---|
| 0 | 0 |
| 4 | 1 |
| 8 | 3 |
| 12 | 4 |
| ⋮ | ⋮ |
| 1020 | 254 |
| 1023 | 255 |

LIQUID CRYSTAL DISPLAY DEVICE AND METHOD FOR DRIVING SAME

TECHNICAL FIELD

The present invention relates to a liquid crystal display device. More particularly, the present invention relates to a liquid crystal display device that performs low-frequency driving, and a method for driving same.

BACKGROUND ART

Conventionally, there are demands for a reduction in power consumption in a display device such as a liquid crystal display device. In recent years, hence, developments have been made in a driving method involving "providing a pausing period between a writing period and a writing period in order to pause a write operation by bringing all gate bus lines (scanning signal lines) into a non-scanning state" for a liquid crystal display device. It should be noted that the writing period refers to a period for charging a pixel capacitance in a display unit, based on an image signal in one frame (one screen). The writing period is also called, for example, a scanning period, a charging period, or a refreshing period. According to the driving method described above, there is no need to apply, for example, a controlling signal to a liquid crystal drive circuit (e.g., a gate driver, a source driver) in the pausing period. Therefore, a drive frequency of the liquid crystal drive circuit is reduced as a whole, so that a reduction in power consumption can be realized. It should be noted that the driving method involving providing the pausing period for pausing the write operation is called, for example, "low-frequency driving" or "pause driving". FIG. 3 is a diagram for illustrating one example of the low-frequency driving. In a liquid crystal display device that employs the low-frequency driving, as shown in FIG. 3, for example, a writing period having a length corresponding to a one frame period (one frame period: 16.67 ms) in a general liquid crystal display device having a refresh rate (a drive frequency) of 60 Hz and a pausing period having a length corresponding to a 59-frame period appear alternately. This low-frequency driving is suitable for still image display.

In recent years, attention has been given to a thin-film transistor using an oxide semiconductor as a channel layer (hereinafter, such a thin-film transistor is referred to as an "oxide TFT"). The oxide TFT has an off-leak current (i.e., a current to be flown in an OFF state) which is considerably smaller than that of a thin-film transistor using, for example, amorphous silicon as a channel layer (hereinafter, such a thin-film transistor is referred to as a "silicon-based TFT"). Therefore, a liquid crystal display device using an oxide TFT as an element in a liquid crystal panel is capable of holding a voltage written on a pixel capacitance, for a relatively long period of time. Accordingly, the low-frequency driving described above is particularly employed for a liquid crystal display device using the oxide TFT as an element in a liquid crystal panel. The low-frequency driving is occasionally employed for a liquid crystal display device using the silicon-based TFT as an element in a liquid crystal panel.

A liquid crystal has a characteristic in that the liquid crystal is degraded when being successively applied with a direct-current voltage. Accordingly, in a liquid crystal display device, a liquid crystal is driven such that the polarity of a voltage (pixel voltage) on a pixel electrode, in a case where a voltage (common electrode voltage) on a common electrode is defined as a reference, is reversed every predetermined period. Assuming that such reversal driving is performed, the common electrode voltage is subjected to an adjustment such that a charging rate at the time when a write operation with positive polarity is performed (at the time when the polarity of the pixel voltage is positive) becomes equal to a charging rate at the time when a write operation with negative polarity is performed (at the time when the polarity of the pixel voltage is negative). This adjustment is called, for example, a "counter adjustment". Moreover, the common electrode voltage to be adjusted such that the charging rate at the time when the write operation with positive polarity is performed becomes equal to the charging rate at the time when the write operation with negative polarity is performed is called, for example, an "optimum counter voltage". Generally, the counter adjustment is made such that flicker is not visually recognized at a certain point on a display unit. Typically, the counter adjustment is made such that flicker is not visually recognized at a center portion of a display unit. The degradation in liquid crystal is effectively suppressed in such a manner that the reversal driving is performed after the counter adjustment.

It should be noted that, in relation to this invention, Japanese Patent Application Laid-Open No. 2008-164852 discloses a liquid crystal display device having the following configuration. An image area is divided into four areas, and common electrode voltages which are different in magnitude from one another can be applied to these four areas. In this liquid crystal display device, the occurrence of flicker is suppressed by setting the value of the common electrode voltage at an optimum value for each area (i.e., by performing counter adjustment for each area).

PRIOR ART DOCUMENT

Patent Document

[Patent Document 1] Japanese Patent Application Laid-Open No. 2008-164852

SUMMARY OF THE INVENTION

Problems to be Solved by the Invention

However, the optimum counter voltage described above varies depending on a location in a display unit. Therefore, for example, when the counter adjustment is made such that flicker is not visually recognized at a center portion of the display unit, flicker occurs at a peripheral portion of the display unit as shown in FIG. 16. In a liquid crystal display device that performs low-frequency driving, particularly, since a cycle of polarity reversal of the pixel voltage is long, such flicker tends to be visually recognized. As described above, with regard to the liquid crystal display device that performs low-frequency driving, it is significantly necessary to suppress the occurrence of flicker.

In the liquid crystal display device disclosed in Japanese Patent Application Laid-Open No. 2008-164852, the image area is divided into the plurality of areas, and the value of the common electrode voltage is set at an optimum value for each area. In actual fact, however, there is a limitation to increase the number of divided image areas (i.e., the number of divided common electrodes). As a result, the counter adjustment cannot be made finely in the entire display unit. Moreover, there is such a demerit that a boundary between the areas is visually recognized by a viewer.

Hence, an object of the present invention is to effectively suppress the occurrence of flicker particularly in a liquid crystal display device that performs low-frequency driving.

Means for Solving the Problems

A first aspect of the present invention is directed to a liquid crystal display device for displaying an image by applying an alternating-current voltage to a liquid crystal based on an input image signal, the liquid crystal display device comprising:

a display unit including a plurality of video signal lines for transmitting a plurality of video signals, a plurality of scanning signal lines intersecting with the plurality of video signal lines, and a plurality of pixel formation portions including a plurality of switching elements arranged in a matrix form in correspondence with intersections between the plurality of video signal lines and the plurality of scanning signal lines, a plurality of pixel electrodes connected to the plurality of switching elements, and a common electrode disposed to face the plurality of pixel electrodes via the liquid crystal and applied with a predetermined voltage, the plurality of pixel formation portions configured to form pixels;

a gradation correction part including a correction value storage part for storing two kinds of correction values for correcting a first gradation which is a gradation of the input image signal, the correction values including a value used when the liquid crystal is applied with a voltage with positive polarity and a value used when the liquid crystal is applied with a voltage with negative polarity, the gradation correction part configured to obtain a second gradation by correcting the first gradation for each pixel based on the correction value; and a liquid crystal drive unit configured to drive the liquid crystal by applying the plurality of video signals to the corresponding video signal lines based on the second gradation.

According to a second aspect of the present invention, in the first aspect of the present invention, the gradation correction part further includes:

a gradation-to-voltage value conversion part including a first lookup table for converting a gradation to a voltage value, the gradation-to-voltage value conversion part configured to convert the first gradation to a first voltage value based on the first lookup table;

an addition and subtraction part configured to obtain a second voltage value by adding the correction value to the first voltage value or subtracting the correction value from the first voltage value; and a voltage value-to-gradation conversion part including a second lookup table for converting a voltage value to a gradation, the voltage value-to-gradation conversion part configured to convert the second voltage value to the second gradation based on the second lookup table.

According to a third aspect of the present invention, in the second aspect of the present invention, the correction value storage part stores therein the correction values for all the pixels, and the addition and subtraction part obtains the second voltage value by adding the correction value stored in the correction value storage part to the first voltage value or subtracting the correction value stored in the correction value storage part from the first voltage value, for all the pixels.

According to a fourth aspect of the present invention, in the second aspect of the present invention, the correction value storage part stores therein the correction values for some of the pixels, with regard to the pixel for which the correction value is stored in the correction value storage part, the addition and subtraction part obtains the second voltage value by adding the correction value stored in the correction value storage part to the first voltage value or subtracting the correction value stored in the correction value storage part from the first voltage value, and with regard to the pixel for which the correction value is not stored in the correction value storage part, the addition and subtraction part obtains the second voltage value by adding a value which is obtained by linear interpolation performed using the correction value for the pixel for which the correction value is stored in the correction value storage part, to the first voltage value or subtracting a value which is obtained by linear interpolation performed using the correction value for the pixel for which the correction value is stored in the correction value storage part, from the first voltage value.

According to a fifth aspect of the present invention, in the second aspect of the present invention, the number of bits of data of the voltage value stored in the first lookup table is larger than the number of bits of data of the gradation stored in the first lookup table.

According to a sixth aspect of the present invention, in the second aspect of the present invention, the voltage value and the gradation are brought into correspondence with each other for predetermined number of voltage values from among the voltage values to be taken, in the second lookup table, and with regard to the voltage value for which the data is not stored in the second lookup table, the voltage value-to-gradation conversion part converts the second voltage value to the second gradation by performing linear interpolation using the data of the voltage value for which the data is stored in the second lookup table.

According to a seventh aspect of the present invention, in the first aspect of the present invention, the gradation correction part makes the correction such that the second gradation becomes smaller than the first gradation at the time when the liquid crystal is applied with the voltage with negative polarity in a case where the gradation correction part makes the correction such that the second gradation becomes larger than the first gradation at the time when the liquid crystal is applied with the voltage with positive polarity, and the gradation correction part makes the correction such that the second gradation becomes larger than the first gradation at the time when the liquid crystal is applied with the voltage with negative polarity in a case where the gradation correction part makes the correction such that the second gradation becomes smaller than the first gradation at the time when the liquid crystal is applied with the voltage with positive polarity.

According to an eighth aspect of the present invention, in the first aspect of the present invention, the gradation correction part obtains the second gradation by directly adding the correction value to the first gradation or subtracting the correction value from the first gradation.

According to a ninth aspect of the present invention, in the first aspect of the present invention, a writing period having a length corresponding to one frame period in which a write operation based on the input image signal is performed and a pausing period having a length corresponding to a multiple-frame period in which the write operation based on the input image signal is paused are repeated alternately, and the operation of the liquid crystal drive unit is stopped in the pausing period.

According to a tenth aspect of the present invention, in the first aspect of the present invention, the switching element is a thin-film transistor made of an oxide semiconductor.

According to an eleventh aspect of the present invention, in the tenth aspect of the present invention, the oxide semiconductor is indium gallium zinc oxide.

A twelfth aspect of the present invention is directed to a method for driving a liquid crystal display device for displaying an image by applying an alternating-current voltage to a liquid crystal based on an input image signal, the liquid crystal display device including a display unit including a plurality of video signal lines for transmitting a plurality of video signals, a plurality of scanning signal lines intersecting with the plurality of video signal lines, and a plurality of pixel formation portions including a plurality of switching elements arranged in a matrix form in correspondence with intersections between the plurality of video signal lines and the plurality of scanning signal lines, a plurality of pixel electrodes connected to the plurality of switching elements, and a common electrode disposed to face the plurality of pixel electrodes via the liquid crystal and applied with a predetermined voltage, the plurality of pixel formation portions configured to form pixels, the method comprising:

a gradation correcting step of obtaining a second gradation by correcting a first gradation which is a gradation of the input image signal, for each pixel; and a liquid crystal driving step of driving the liquid crystal by applying the plurality of video signals to the corresponding video signal lines based on the second gradation, wherein the liquid crystal display device includes a correction value storage part for storing two kinds of correction values for correcting the first gradation, the correction values including a value used when the liquid crystal is applied with a voltage with positive polarity and a value used when the liquid crystal is applied with a voltage with negative polarity, and in the gradation correcting step, the second gradation is obtained by correcting the first gradation based on the correction value stored in the correction value storage part.

Effects of the Invention

According to the first aspect of the present invention, a gradation of an input image signal is corrected for each pixel based on a correction value stored in the correction value storage part, and a video signal based on the corrected gradation is applied to the video signal line. Therefore, it is possible to bring values of optimum counter voltages on all the pixels close to one another (to minimize variations in optimum counter voltage) by setting the correction value at a suitable value. Thus, it is possible to make a charging rate in a case where a write operation with positive polarity is performed on all pixels almost equal to a charging rate in a case where a write operation with negative polarity is performed on all pixels even when a counter adjustment is performed with any location in the display unit defined as a reference. As a result, it is possible to suppress the occurrence of flicker.

According to the second aspect of the present invention, a gradation of an input image signal is converted to a voltage value, and the voltage value is corrected based on a correction value stored in the correction value storage part. Then the corrected voltage value is converted to a gradation, and a video signal based on the converted gradation is applied to the video signal line. As described above, the gradation is corrected by correcting the voltage value. Therefore, it is possible to adjust an optimum counter voltage on each pixel with high accuracy. Thus, it is possible to further minimize variations in optimum counter voltage and to effectively suppress the occurrence of flicker.

According to the third aspect of the present invention, a voltage value is corrected using a correction value specified for each pixel. Therefore, it is possible to adjust an optimum counter voltage on each pixel with higher accuracy. Thus, it is possible to considerably effectively suppress the occurrence of flicker.

According to the fourth aspect of the present invention, a capacitance for data to be stored in the correction value storage part is minimized. Thus, it is possible to effectively suppress the occurrence of flicker while suppressing an increase in capacitance of a storage part (e.g., a memory) required for a liquid crystal display device.

According to the fifth aspect of the present invention, it is possible to correct a voltage value with higher accuracy. Therefore, it is possible to further minimize variations in optimum counter voltage and to effectively suppress the occurrence of flicker.

According to the sixth aspect of the present invention, a capacitance for data to be stored in the second lookup table is minimized. Thus, it is possible to effectively suppress the occurrence of flicker while suppressing an increase in capacitance of a storage part (e.g., a memory) required for a liquid crystal display device.

According to the seventh aspect of the present invention, it is possible to more effectively minimize a difference between a charging rate in a case where a write operation with positive polarity is performed and a charging rate in a case where a write operation with negative polarity is performed. Thus, it is possible to effectively suppress the occurrence of flicker.

According to the eighth aspect of the present invention, a gradation of an input image signal is directly corrected without conversion of a gradation to a voltage value. Therefore, there is no need to provide a constituent element for performing data conversion between a gradation and a voltage value. Thus, it is possible to obtain an effect of reduction in circuit scale and an effect of reduction in cost.

According to the ninth aspect of the present invention, it is possible to obtain a similar effect to that according to the first aspect of the present invention, in a liquid crystal display device that performs low-frequency driving.

According to the tenth aspect of the present invention, it is possible to obtain a similar effect to that according to the first aspect of the present invention, in a liquid crystal display device employing, as a switching element, a thin-film transistor made of an oxide semiconductor.

According to the eleventh aspect of the present invention, it is possible to obtain a similar effect to that according to the first aspect of the present invention, in a liquid crystal display device employing, as a switching element, a thin-film transistor made of indium gallium zinc oxide.

According to the twentieth aspect of the present invention, it is possible to obtain a similar effect to that according to the first aspect of the present invention, in a method for driving a liquid crystal display device.

BRIEF DESCRIPTION OF THE DRAWINGS

FIG. 4 is a schematic diagram showing one example of a gradation-to-voltage value conversion table (first lookup table) in the first embodiment.

FIG. 5 is a schematic diagram showing one example of a correction value map in the first embodiment.

FIG. 6 is a schematic diagram showing one example of a voltage value-to-gradation conversion table (second lookup table) in the first embodiment.

FIG. 7 is a flowchart showing a procedure of data conversion processing, in the first embodiment.

MODES FOR CARRYING OUT THE INVENTION

Hereinafter, embodiments of the present invention will be described with reference to the attached drawings.

<1. First Embodiment>
<1.1 Overall Configuration and Operations Overview>

Figure 2:
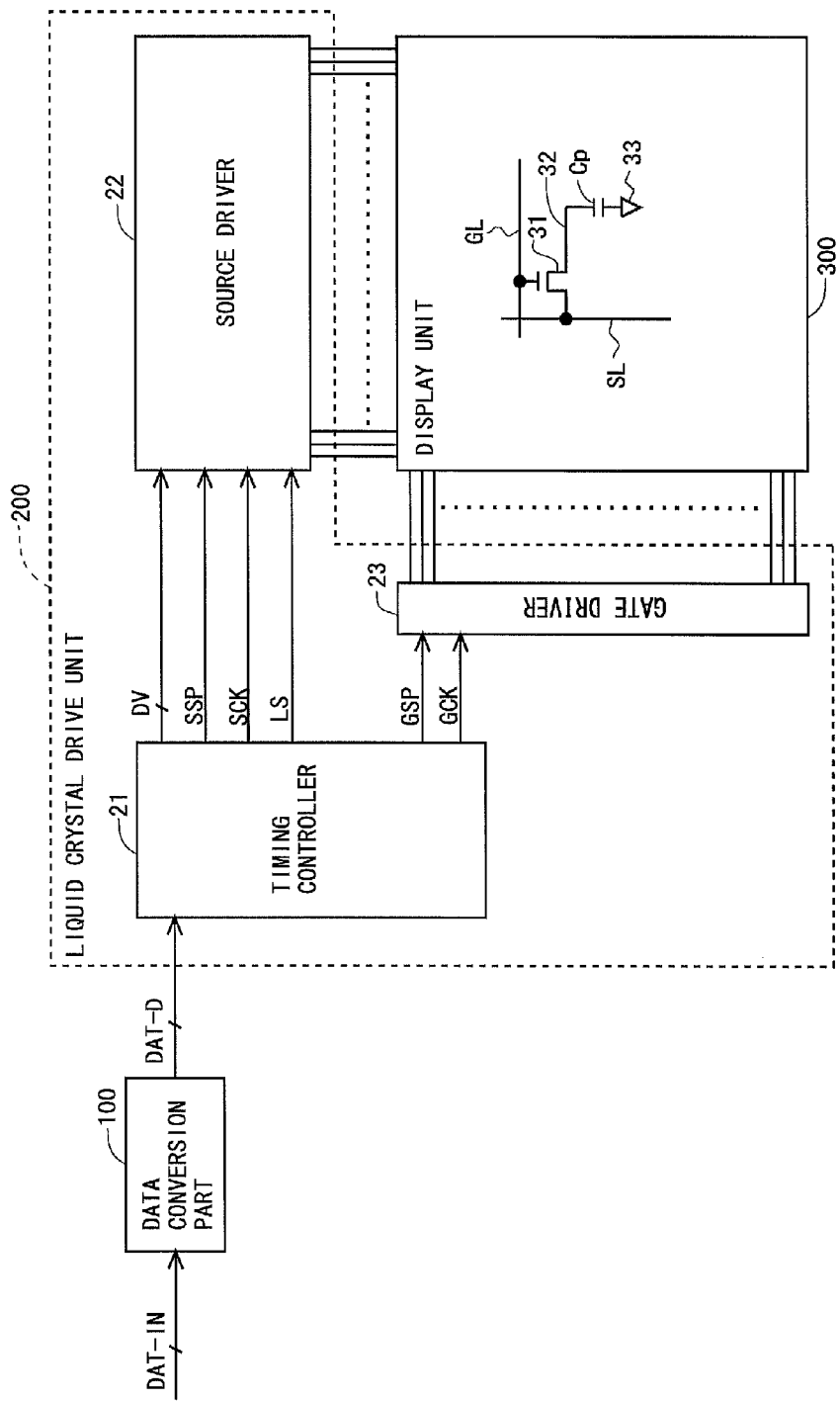
FIG. 2 is a block diagram showing an overall configuration of the liquid crystal display device, in the first embodiment.

FIG. 2 is a block diagram showing an overall configuration of a liquid crystal display device according to a first embodiment of the present invention. The liquid crystal display device is constituted by a data conversion part 100, a liquid crystal drive unit 200, and a display unit 300. It should be noted that the detailed configuration of the data conversion part 100 will be described later. The liquid crystal drive unit 200 includes a timing controller 21, a source driver (video signal line drive circuit) 22, and a gate driver (scanning signal line drive circuit) 23.

Figure 3:
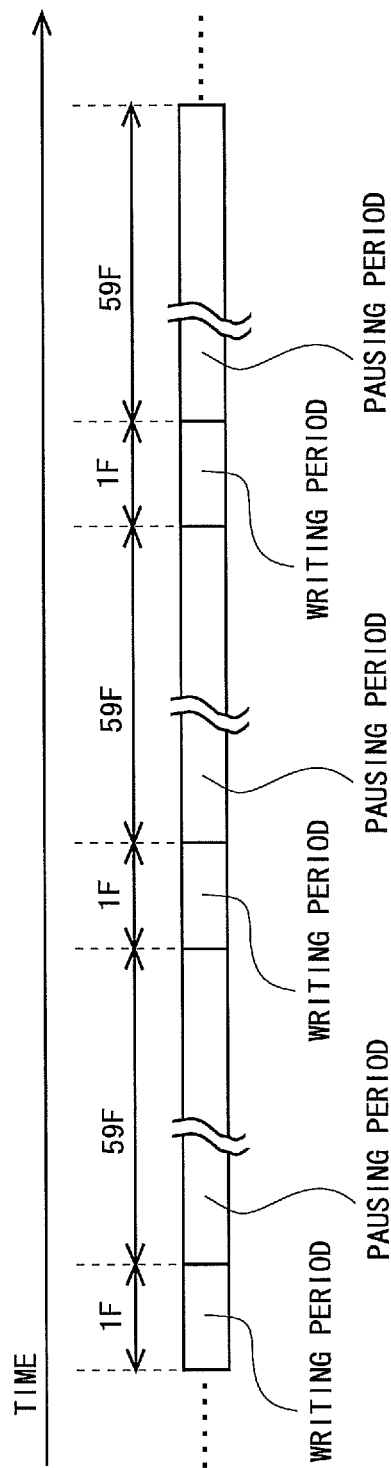
FIG. 3 is a diagram for illustrating low-frequency driving.

The liquid crystal display device according to the present embodiment typically performs low-frequency driving (see FIG. 3). That is, a pausing period having a length corresponding to a several- to several-tens-of-frame period (e.g., a 59-frame period) is provided after a writing period for charging a pixel capacitance in a display unit. It should be noted that the present invention is also applicable to a liquid crystal display device that performs normal driving.

With regard to FIG. 2, a plurality of source bus lines (video signal lines) SL and a plurality of gate bus lines (scanning signal lines) GL are disposed on the display unit 300. A pixel formation portion that forms a pixel is provided in correspondence with each intersection between the source bus line SL and the gate bus line GL. In other words, the display unit 300 includes the plurality of pixel formation portions. The plurality of pixel formation portions are arranged in a matrix form to constitute a pixel array. Each pixel formation portion includes: a TFT (Thin-Film Transistor) 31 which is a switching element having a gate terminal connected to the gate bus line GL passing the corresponding intersection, and a source terminal connected to the source bus line SL passing the intersection; a pixel electrode 32 connected to a drain terminal of the TFT 31; a common electrode 33 which is a counter electrode for applying a common voltage to the plurality of pixel formation portions; and a liquid crystal (liquid crystal layer) provided commonly for the plurality of pixel formation portions and sandwiched between the pixel electrode 32 and the common electrode 33. A liquid crystal capacitance formed by the pixel electrode 32 and the common electrode 33 constitutes a pixel capacitance Cp. Generally, an auxiliary capacitance is provided in parallel with the liquid crystal capacitance in order that the pixel capacitance Cp securely holds a voltage. However, the auxiliary capacitance is not described and shown here because the auxiliary capacitance is not directly pertinent to the present invention. In such a configuration, the common electrode 33 is applied with a predetermined voltage Vcom. It should be noted that only the constituent elements of one pixel formation portion are shown in the display unit 300 in FIG. 2.

As described above, typically, the low-frequency driving is performed in the present embodiment. In the present embodiment, typically, an oxide TFT (i.e., a thin-film transistor using an oxide semiconductor as a channel layer) is used as the TFT 31 in the pixel formation portion. More specifically, a channel layer of the TFT 31 is made of InGaZnOx (Indium Gallium Zinc Oxide) mainly composed of indium (In), gallium (Ga), zinc (Zn), and oxygen (O). Hereinafter, a TFT using InGaZnOx as a channel layer is referred to as an "IGZO-TFT". By the way, a silicon-based TFT (i.e., a thin-film transistor using, for example, amorphous silicon as a channel layer) has a relatively large off-leak current. Therefore, in a case of using the silicon-based TFT as the TFT 31 in the pixel formation portion, an electric charge held by the pixel capacitance Cp is leaked via the TFT 31. As a result, a voltage to be held in an OFF state varies. In contrast to this, the IGZO-TFT has an off-leak current which is much smaller than that of the silicon-based TFT. Therefore, it is possible to hold a voltage (liquid crystal applied voltage) written in the pixel capacitance Cp for a longer period of time. Accordingly, the IGZO-TFT is suitably used in the case of performing the low-frequency driving. It should be noted that the similar effect can be produced also in a case of using, as a channel layer, an oxide semiconductor including at least one of indium, gallium, zinc, copper (Cu), silicon (Si), tin (Sn), aluminum (Al), calcium (Ca), germanium (Ge), lead (Pb), and the like, as the oxide semiconductor other than InGaZnOx. The oxide TFT used as the TFT 31 in the pixel formation portion is merely one example, and a silicon-based TFT or the like may be used in place of the oxide TFT.

Next, operations of the constituent elements shown in FIG. 2 are described. The data conversion part 100 corrects a gradation of an input image signal DAT-IN (hereinafter, such a gradation is also referred to as an "input gradation"), and outputs a driving image signal DAT-D indicating the corrected gradation (hereinafter, also referred to as an "output gradation"). It should be noted that the input gradation corresponds to a first gradation, and the output gradation corresponds to a second gradation. The liquid crystal drive unit 200 includes the timing controller 21, the source driver 22, and the gate driver 23, and drives the liquid crystal in the display unit 300 based on the driving image signal DAT-D. The timing controller 21 receives the driving image signal DAT-D. Then the timing controller 21 outputs a digital video signal DV; a source start pulse signal SSP, a source clock signal SCK, and a latch strobe signal LS which are for controlling the operation of the source driver 22; and a gate start pulse signal GSP and a gate clock signal GCK which are for controlling the operation of the gate driver 23. The source driver 22 applies a driving video signal to each source bus line SL, based on the digital video signal DV, the source start pulse signal SSP, the source clock signal SCK, and the latch strobe signal LS each output from the timing controller 21. The gate driver 23 applies a scanning signal to each gate bus line GL, based on the gate start pulse signal GSP and the gate clock signal GCK each output from the timing controller 21. Thus, the plurality of gate bus lines GL are selectively driven one by one.

Each source bus line SL is applied with the driving video signal and each gate bus line GL is applied with the scanning signal as described above, so that an image based on the input image signal DAT-IN is displayed on the display unit 300.

<1.2 Data Conversion Part>

Figure 1:
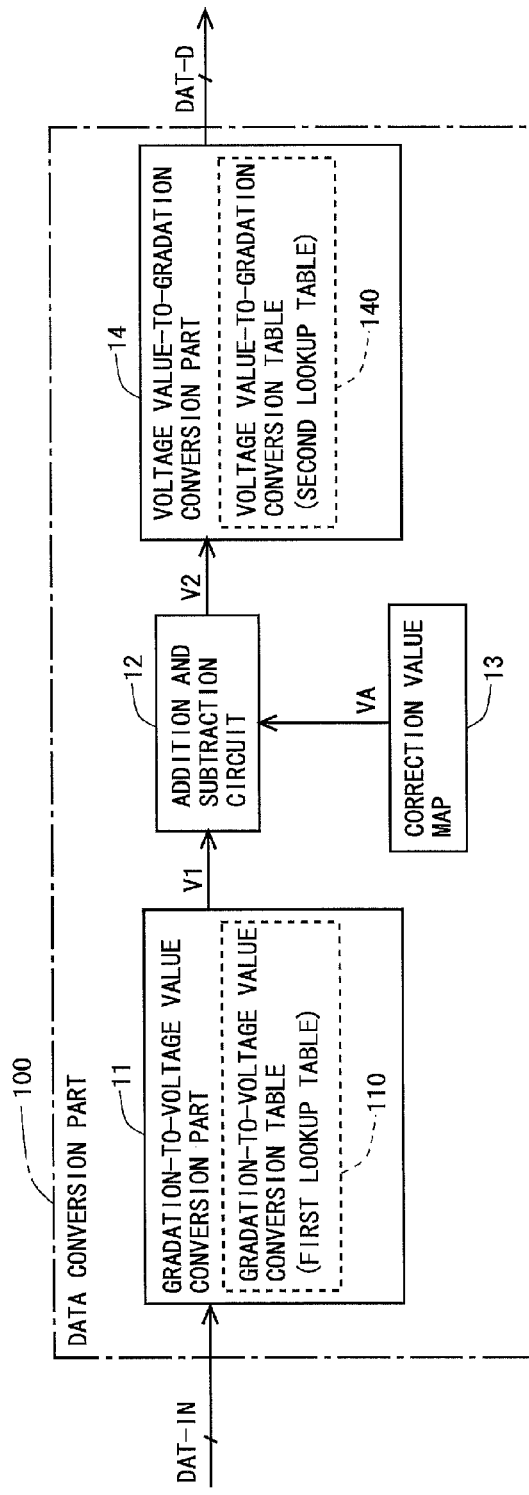
FIG. 1 is a block diagram showing a configuration of a data conversion part in a liquid crystal display device according to a first embodiment of the present invention.

Next, the configuration of the data conversion part 100 is described. FIG. 1 is a block diagram showing the configuration of the data conversion part 100 in the present embodiment. As shown in FIG. 1, the data conversion part 100 is constituted by a gradation-to-voltage value conversion part 11, an addition and subtraction circuit 12, a correction value map 13, and a voltage value-to-gradation conversion part 14. The gradation-to-voltage value conversion part 11 includes a gradation-to-voltage value conversion table (first lookup table) 110. The voltage value-to-gradation conversion part 14 includes a voltage value-to-gradation conversion table (second lookup table) 140.

The gradation-to-voltage value conversion table 110 is a table for converting a gradation to a value corresponding to a voltage (hereinafter, such a value is referred to as a "voltage value" for convenience). FIG. 4 is a schematic diagram showing one example of the gradation-to-voltage value conversion table 110 in the liquid crystal display device that receives the input image signal DAT-IN with 256 gradations (gradations from 0 or more to 255 or less). The gradation-to-voltage value conversion table 110 stores therein a plurality of gradations (256 gradations in the example shown in FIG. 4) and voltage values corresponding to the respective gradations. The gradation-to-voltage value conversion part 11 converts an input gradation to a voltage value, using the gradation-to-voltage value conversion table 110. For example, pixel data with an input gradation of "2" is converted to pixel data with a voltage value of "9" (see a row shown with an arrow denoted with reference character 51 in FIG. 4). It should be noted that, hereinafter, the voltage value obtained from the conversion by the gradation-to-voltage value conversion part 11 is referred to as a "first voltage value" which is denoted with reference character V1.

The addition and subtraction circuit 12 adds or subtracts a correction value VA specified in accordance with a location of a pixel, to or from the first voltage value V1 obtained by the conversion processing using the gradation-to-voltage value conversion table 110. Then the addition and subtraction circuit 12 outputs, as a second voltage value V2, the value obtained by the addition/subtraction processing. It should be noted that the correction value VA is stored in the correction value map 13 as will be described later.

The correction value map 13 is a data storage region for storing the correction value VA for correcting the first voltage value V1 for each pixel. FIG. 5 is a schematic diagram showing one example of the correction value map in the liquid crystal display device with 1024-by 768-pixel resolution. As shown in FIG. 5, the correction value VA for each pixel is stored in the correction value map 13. For example, the correction value VA for the pixel of "lengthwise address=5" and "widthwise address=4" is "3". Moreover, for example, the correction value VA for the pixel of "lengthwise address=2" and "widthwise address=1022" is "−5". The correction value VA for each pixel in the correction value map 13 is set in advance such that optimum counter voltages of all the pixels are to be equal with one another by data conversion processing to be described later. The addition and subtraction circuit 12 performs the addition/subtraction processing, using the correction value VA stored in this correction value map 13. At this time, when the correction value VA is a positive value, the correction value VA is added to the first voltage value V1. On the other hand, when the correction value VA is a negative value, an absolute value of the correction value VA is subtracted from the first voltage value V1. It should be noted that, in the data conversion part 100, the correction value map 13 includes a map to be used in a case where a write operation with positive polarity is performed (i.e., a correction value map for positive polarity) and a map to be used in a case where a write operation with negative polarity is performed (i.e., a correction value map for negative polarity). Alternatively, one correction value map 13 may store therein a correction value for positive polarity and a correction value for negative polarity, for each pixel.

The voltage value-to-gradation conversion table 140 is a table for converting a voltage value to a gradation. FIG. 6 is a schematic diagram showing one example of the voltage value-to-gradation conversion table 140 in the liquid crystal display device that performs gradation display with 256 gradations (gradations from 0 or more to 255 or less). The voltage value-to-gradation conversion table 140 stores therein a plurality of voltage values (1024 voltage values in the example shown in FIG. 6) and gradations corresponding to the respective voltage values. The voltage value-to-gradation conversion part 14 converts a second voltage value V2 to a gradation (output gradation), using this voltage value-to-gradation conversion table 140. For example, pixel data with a second voltage value V2 of "3" is converted to pixel data with a gradation (output gradation) of "1" (see a row shown with an arrow denoted with reference character 52 in FIG. 6).

In the data conversion part 100, as described above, the gradation is corrected for each pixel, based on the correction value VA stored in the correction value map 13. It should be noted that, in the present embodiment, the data conversion part 100 realizes a gradation correction part, and the correction value map 13 (the correction value map for positive polarity and the correction value map for negative polarity) realizes a correction value storage part.

<1.3 Data Conversion Processing>

The data conversion processing to be performed by the data conversion part 100 is described in detail. FIG. 7 is a flowchart showing a procedure of the data conversion processing in a case where attention is given to a piece of pixel data. After the start of the data conversion processing, first, a gradation (an input gradation) of an input image signal DAT-IN is converted to a first voltage value V1 (step S10). The conversion processing in step S10 is performed using the gradation-to-voltage value conversion table 110 (see FIG. 4). With this processing, for example, 8-bit pixel data indicating a gradation is converted to 10-bit pixel data indicating a voltage value corresponding to this gradation.

Next, the first voltage value V1 is corrected using the correction value VA stored in the correction value map 13 (step S20). At this time, the correction value map for positive polarity is used for a pixel subjected to the write operation with positive polarity whereas the correction value map for negative polarity is used for a pixel subjected to the write operation with negative polarity. Moreover, as described above, when the correction value VA is a positive value, the correction value VA is added to the first voltage value V1. On the other hand, when the correction value VA is a negative value, an absolute value of the correction value VA is subtracted from the first voltage value V1. A second voltage value V2 is output from the addition and subtraction circuit 12 by the correction processing in step S20. It should be noted that, when the value after the addition exceeds a maximum voltage value, the second voltage value V2 is set at the maximum voltage value. Moreover, when the value after the subtraction is smaller than zero, the second voltage value V2 is set at zero.

Next, the second voltage value V2 output from the addition and subtraction circuit 12 is converted to a gradation (output gradation) (step S30). The conversion processing in step S30 is performed using the voltage value-to-gradation conversion table 140 (see FIG. 6). With this processing, for example, 10-bit pixel data indicating a voltage value is converted to 8-bit pixel data indicating a gradation corresponding to this voltage value. After the completion of step S30, the data conversion processing in the data conversion part 100 is finished.

It should be noted that the reason why the gradation is converted to the voltage value and the voltage value is corrected is because the objective is to equalize optimum counter voltages of all the pixels, that is, to adjust the voltage value. In the gradation-to-voltage value conversion table 110, preferably, the number of bits in the data of the voltage value is made larger than the number of bits in the data of the gradation. In the example shown in FIG. 4, the number of bits in the data of the gradation is "8" whereas the number of bits in the data of the voltage value is "10". Thus, the voltage value can be corrected with higher accuracy.

Figure 8:
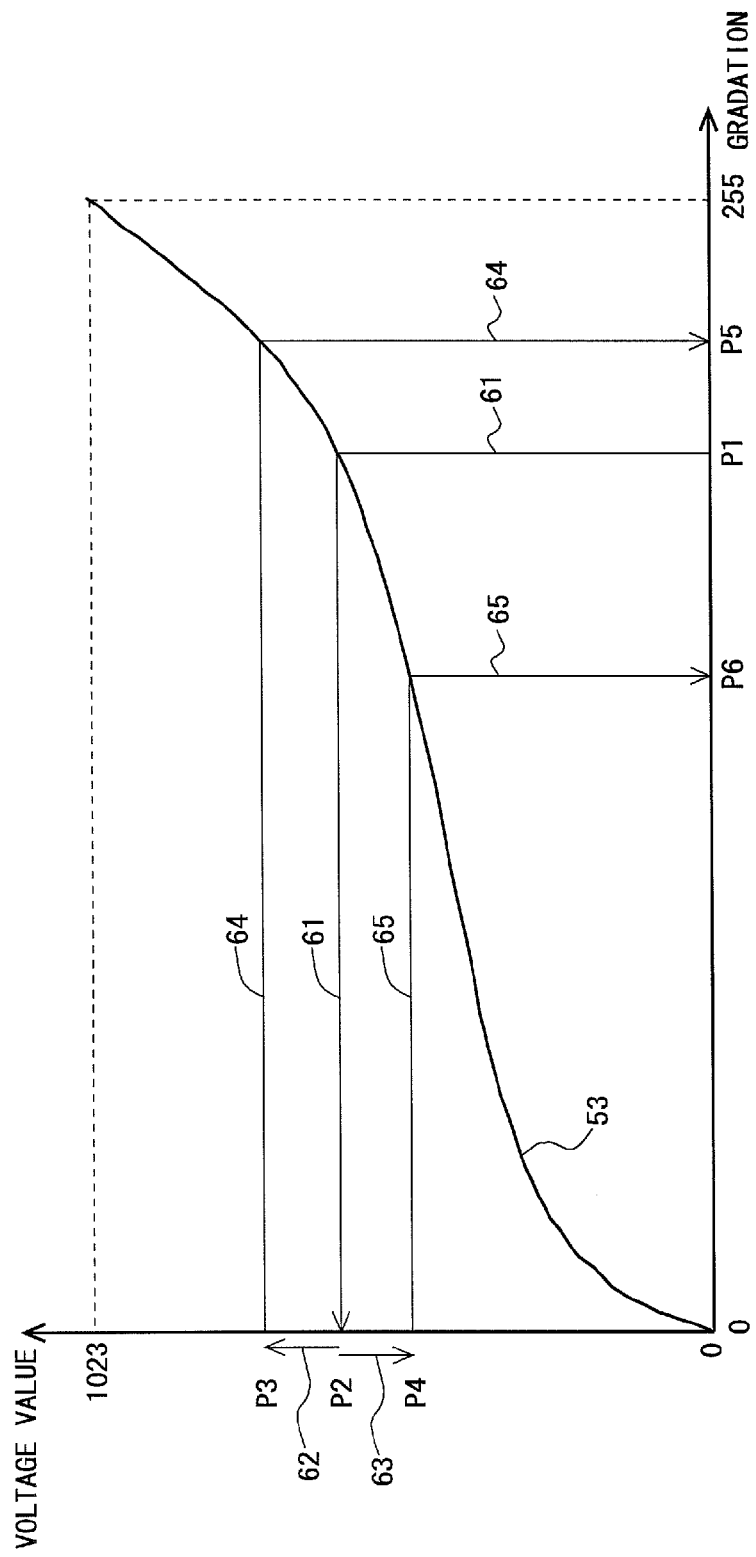
FIG. 8 is a diagram for illustrating data conversion processing in a case where a write operation with positive polarity is performed, in the first embodiment.
Figure 9:
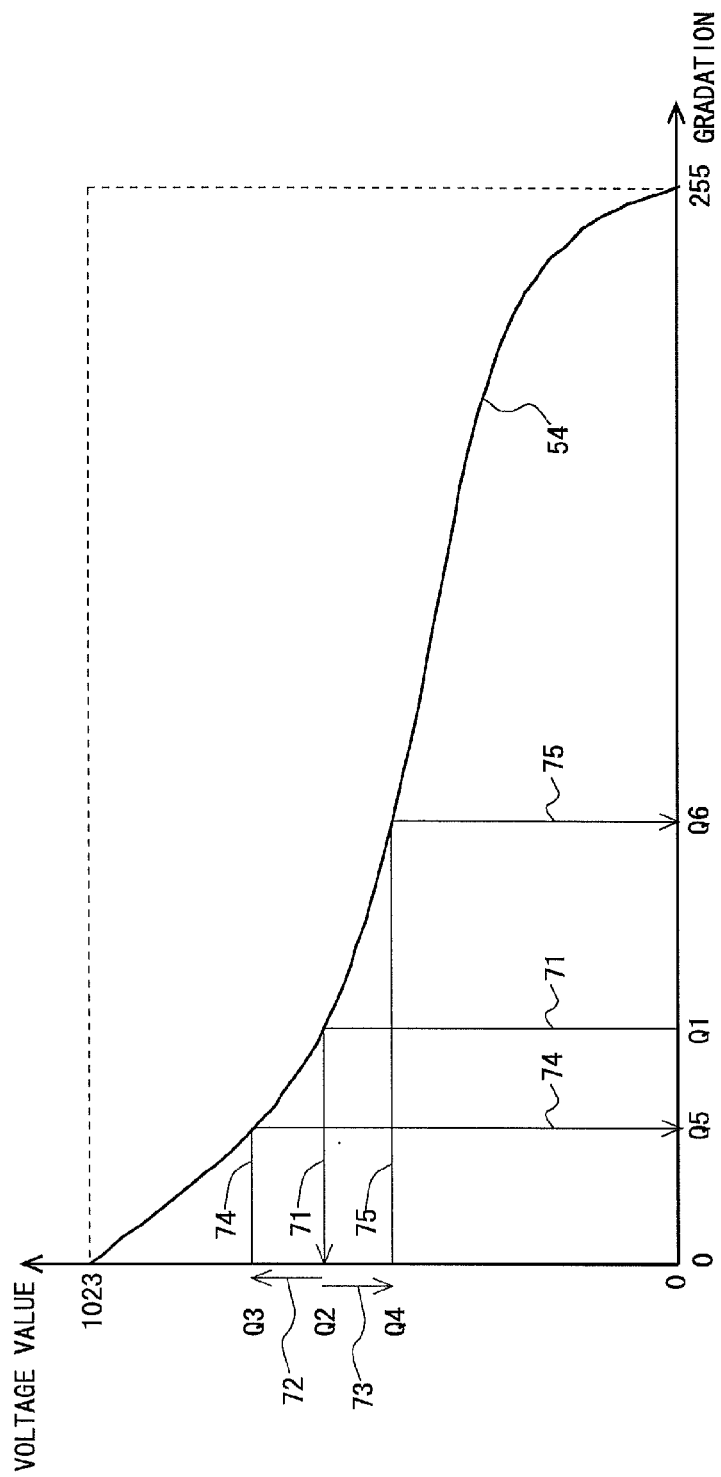
FIG. 9 is a diagram for illustrating data conversion processing in a case where a write operation with negative polarity is performed, in the first embodiment.

The data conversion processing is further described with reference to FIGS. 8 and 9. It should be noted that FIG. 8 is a diagram for illustrating the data conversion processing in the case where the write operation with positive polarity is performed. FIG. 9 is a diagram for illustrating the data conversion processing in the case where the write operation with negative polarity is performed. In FIGS. 8 and 9, the horizontal axis indicates a gradation, and the vertical axis indicates a voltage value. Moreover, a curve denoted with reference character 53 in FIG. 8 and a curve denoted with reference character in FIG. 9 each indicate a correspondence relation between the gradation and the voltage value.

First, the case where the write operation with positive polarity is performed is described with reference to FIG. 8. When an input gradation is P1, P2 which is a voltage value (first voltage value V1) corresponding to this input gradation is obtained from the gradation-to-voltage value conversion table 110. An arrow denoted with reference character 61 in FIG. 8 corresponds to the conversion processing using the gradation-to-voltage value conversion table 110. Next, a correction value VA is obtained from the correction value map 13 in accordance with a location of a pixel to be processed. At this time, when the correction value VA is a positive value, P3 is obtained by addition of VA to P2. An arrow denoted with reference character 62 in FIG. 8 corresponds to the addition processing by the addition and subtraction circuit 12. On the other hand, when the correction value VA is a negative value, P4 is obtained by subtraction of an absolute value of VA from P2. An arrow denoted with reference character 63 in FIG. 8 corresponds to the subtraction processing by the addition and subtraction circuit 12. Next, an output gradation corresponding to the voltage value (second voltage value V2) is obtained from the voltage value-to-gradation conversion table 140. Specifically, when the correction value VA is a positive value, P5 which is an output gradation corresponding to P3 is obtained from the voltage value-to-gradation conversion table 140. When the correction value VA is a negative value, P6 which is an output gradation corresponding to P4 is obtained from the voltage value-to-gradation conversion table 140. An arrow denoted with reference character 64 in FIG. 8 corresponds to the conversion processing using the voltage value-to-gradation conversion table 140 in the case where the correction value VA is a positive value. An arrow denoted with reference character 65 in FIG. 8 corresponds to the conversion processing using the voltage value-to-gradation conversion table 140 in the case where the correction value VA is a negative value.

Next, the case where the write operation with negative polarity is performed is described with reference to FIG. 9. When an input gradation is Q1, Q2 which is a voltage value (first voltage value V1) corresponding to this input gradation is obtained from the gradation-to-voltage value conversion table 110. An arrow denoted with reference character 71 in FIG. 9 corresponds to the conversion processing using the gradation-to-voltage value conversion table 110. Next, a correction value VA is obtained from the correction value map 13 in accordance with a location of a pixel to be processed. At this time, when the correction value VA is a positive value, Q3 is obtained by addition of VA to Q2. An arrow denoted with reference character 72 in FIG. 9 corresponds to the addition processing by the addition and subtraction circuit 12. On the other hand, when the correction value VA is a negative value, Q4 is obtained by subtraction of an absolute value of VA from Q2. An arrow denoted with reference character 73 in FIG. 9 corresponds to the subtraction processing by the addition and subtraction circuit 12. Next, an output gradation corresponding to a voltage value (second voltage value V2) is obtained from the voltage value-to-gradation conversion table 140. Specifically, when the correction value VA is a positive value, Q5 which is an output gradation corresponding to Q3 is obtained from the voltage value-to-gradation conversion table 140. When the correction value VA is a negative value, Q6 which is an output gradation corresponding to Q4 is obtained from the voltage value-to-gradation conversion table 140. An arrow denoted with reference character 74 in FIG. 9 corresponds to the conversion processing using the voltage value-to-gradation conversion table 140 in the case where the correction value VA is a positive value. An arrow denoted with reference character 75 in FIG. 9 corresponds to the conversion processing using the voltage value-to-gradation conversion table 140 in the case where the correction value VA is a negative value.

It should be noted that, typically, the correction is performed such that the output gradation becomes smaller than the input gradation as to the write operation with negative polarity in the case where the correction is performed such that the output gradation becomes larger than the input gradation with regard to the write operation with positive polarity, and the correction is performed such that the output gradation becomes larger than the input gradation as to the write operation with negative polarity in the case where the correction is performed such that the output gradation becomes smaller than the input gradation with regard to the write operation with positive polarity.

As described above, in the present embodiment, for each pixel data, first, an input gradation is converted to a voltage value (first voltage value V1) then, next, the voltage value is corrected in accordance with a location of the pixel, and further, the corrected voltage value (second voltage value V2) is converted to an output gradation. Thus, a voltage of a driving video signal in a case where a write operation is performed is adjusted for each pixel.

<1.4 Effects>

Figure 16:
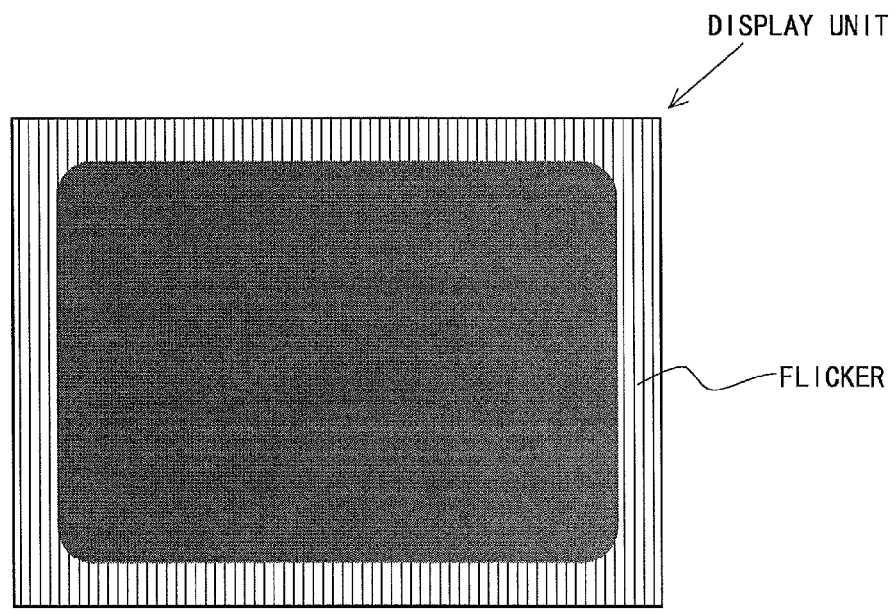
FIG. 16 is a diagram for illustrating a problem in a conventional example.

According to the present embodiment, the input image signal DAT-IN is corrected using the correction value map 13 that stores therein the correction value VA specified for each pixel. In the correction value map 13, the correction value VA is set such that optimum counter voltages of all the pixels are to be equal with one another by data conversion processing. Therefore, even when the counter adjustment is performed with any location in the display unit 300 defined as a reference, the voltage of which the magnitude (value) is currently set as the common electrode voltage Vcom is used as the optimum counter voltage for all the pixels. As a result, a charging rate in the case where the write operation with positive polarity is performed becomes equal to a charging rate in the case where the write operation with negative polarity is performed, in all the pixels. Accordingly, when the counter adjustment is performed with the center portion of the display unit 300 defined as a reference, although flicker is visually recognized at the peripheral portion of the display unit 300 according to the conventional example (see FIG. 16), no flicker is visually recognized according to the present embodiment (see FIG. 10). Thus, flicker is less prone to being visually recognized even in a case of a liquid crystal display device in which flicker tends to be visually recognized because a cycle of polarity reversal of the pixel voltage is long, such as a liquid crystal display device that performs low-frequency driving. Thus, a liquid crystal display device capable of effectively suppressing the occurrence of flicker is realized.

<1.5 Modification>

In the first embodiment, with regard to the voltage value-to-gradation conversion table 140, data corresponding to each of all the voltage values is stored (see FIG. 6). Specifically, the voltage value-to-gradation conversion table 140 shown in FIG. 6 stores therein data corresponding to each of the 1024 voltage values from "0" to "1023".

Figures 10, 11:
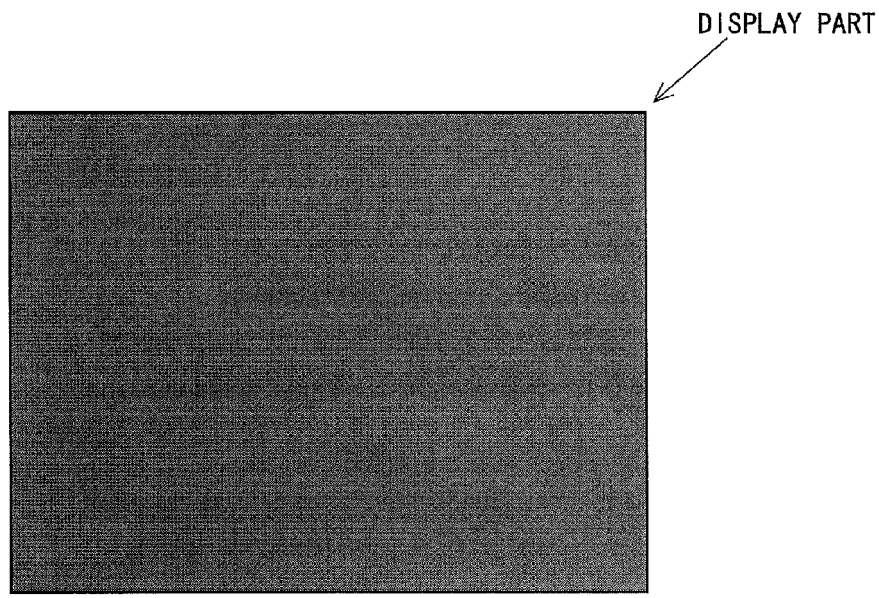
FIG. 10 is a diagram for illustrating an effect in the first embodiment.
FIG. 11 is a schematic diagram showing one example of the voltage value-to-gradation conversion table (second lookup table) in a modification of the first embodiment.

However, the present invention is not limited thereto. The voltage value-to-gradation conversion table 140 may store therein data corresponding to each of the voltage values every predetermined interval, from among the voltage values to be taken. For example, the configuration may be such that the voltage value-to-gradation conversion table 140 stores therein the data corresponding to each of the multiples of four from "0" to "1020" and the data corresponding to "1023" as shown in FIG. 11, and the gradation is obtained by linear interpolation as to the voltage values which are not stored in the table 140. Thus, it is possible to minimize the capacitance of a storage part (e.g., a memory) required for the liquid crystal display device.

<2. Second Embodiment>

<2.1 Configuration and Data Conversion Processing>

A second embodiment of the present invention is described. An overall configuration and an operations overview are similar to those in the first embodiment; therefore, the description thereof will not be given (see FIG. 1).

Figure 12:
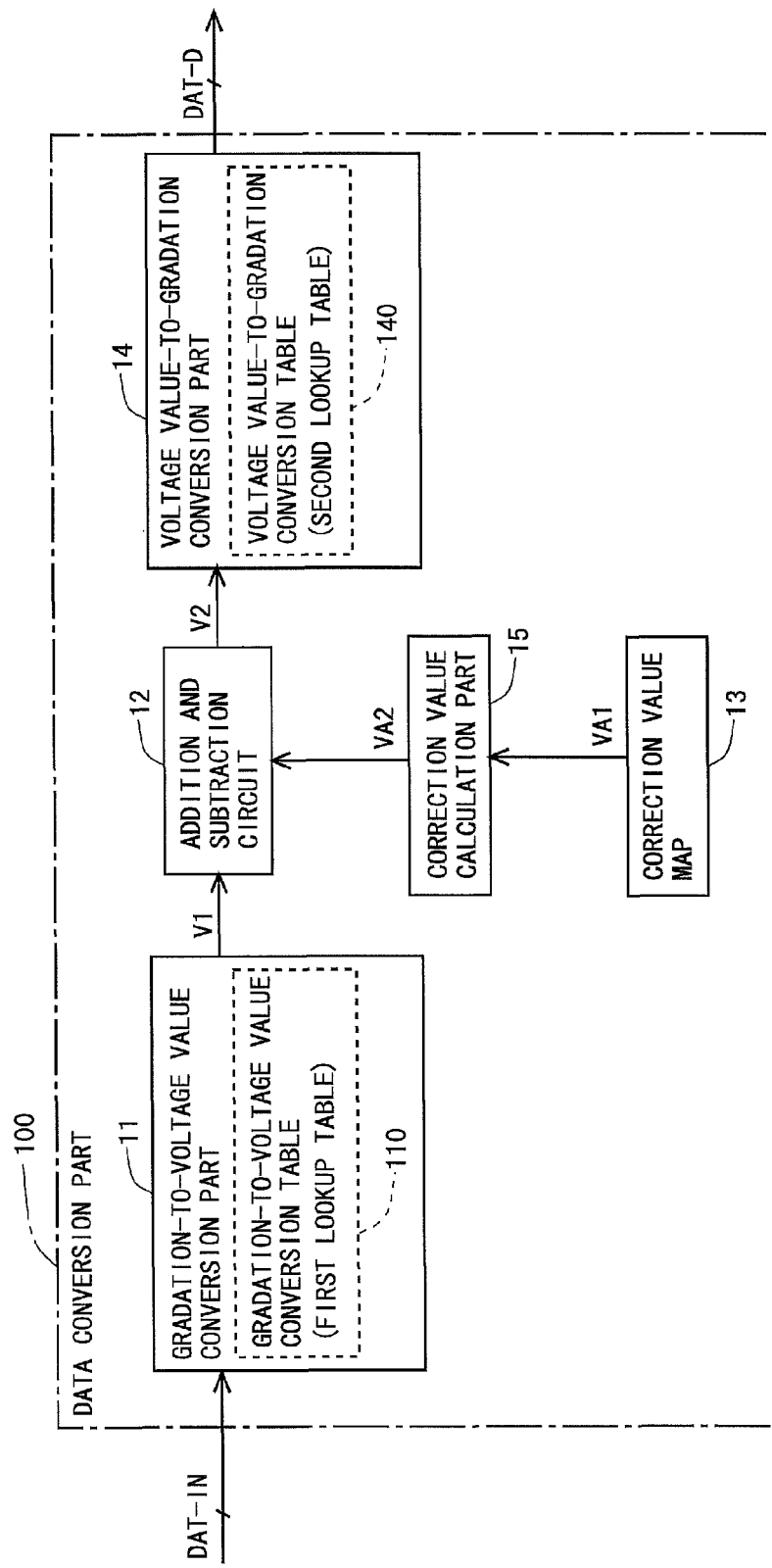
FIG. 12 is a block diagram showing a configuration of a data conversion part in a liquid crystal display device according to a second embodiment of the present invention.

FIG. 12 is a block diagram showing a configuration of a data conversion part 100 in the present embodiment. In the present embodiment, as shown in FIG. 12, the data conversion part 100 includes a correction value calculation part 15 in addition to the constituent elements described in the first embodiment. In the first embodiment, the correction value map 13 stores therein the correction values VA for all the pixels. In contrast to this, in the present embodiment, a correction value map 13 stores therein correction values VA1 for some of all pixels (e.g., 25 pixels). With regard to data which is not stored in the correction value map 13, a correction value VA2 for a pixel to be processed is obtained by performing linear interpolation using the correction value VA1 stored in the correction value map 13. In order to perform this linear interpolation using the correction value VA1, the correction value calculation part 15 is provided in the data conversion part 100. The present embodiment is different from the first embodiment in that an addition and subtraction circuit 12 performs addition/subtraction processing, using the correction value VA2 obtained by the correction value calculation part 15.

Figures 13, 14:
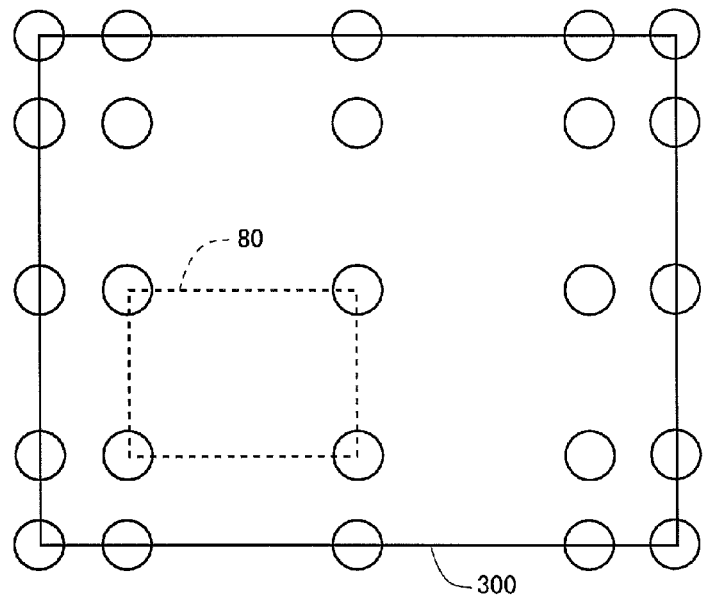
FIG. 13 is a diagram for illustrating a correction value map in the second embodiment.
FIG. 14 is a diagram for illustrating the calculation of a correction value by linear interpolation, in the second embodiment.

FIG. 13 is a diagram schematically showing a location of the pixel for which the correction value VA1 is stored in the correction value map 13. In this way, the correction value map 13 stores therein only the correction values VA1 for, for example, 25 pixels. At this time, a correction value VA2 for the pixel for which the correction value VA1 is not stored in the correction value map 13 is obtained as follows.

For example, attention is now given to pixels in a rectangle denoted with reference character 80 shown in FIG. 13. With regard to this rectangle, the upper left coordinate, upper right coordinate, lower left coordinate, and lower right coordinate are defined as (X1,Y1), (Xm,Y1), (X1,Yn), and (Xm,Yn), respectively. In this case, the coordinates of the pixels in the rectangle are represented as shown in FIG. 14. The correction values VA1 corresponding to (X1,Y1), (Xm,Y1), (X1,Yn), and (Xm,Yn) are stored in the correction value map 13. Under the assumption described above, first, correction values VA2 for all the pixels included in the column shown with an arrow denoted with reference character 81 in FIG. 14 are obtained by performing linear interpolation using the correction value VA1 corresponding to (X1,Y1) and the correction value VA1 corresponding to (X1,Yn). Next, correction values VA2 for all the pixels included in the column shown with an arrow denoted with reference character 82 in FIG. 14 are obtained by performing linear interpolation using the correction value VA1 corresponding to (Xm,Y1) and the correction value VA1 corresponding to (Xm,Yn). Further, correction values VA2 for all the pixels included in the row shown with an arrow denoted with reference character 83 in FIG. 14 are obtained by performing linear interpolation using the correction value VA1 corresponding to (X1,Y1) and the correction value VA1 corresponding to (Xm,Y1). Correction values VA2 for all the pixels included in the respective rows are obtained in a manner similar to that described above. The processing described above is performed throughout a display unit 300, so that the correction values VA2 are obtained for all the pixels in the display unit 300. It should be noted that, with regard to the pixel for which the correction value VA1 is stored in the correction value map 13, the correction value VA1 is set at the correction value VA2 as it is.

<2.2 Effects>

According to the present embodiment, an amount of data stored in the correction value map 13 is reduced as compared with the first embodiment. Thus, it is possible to effectively suppress the occurrence of flicker while suppressing an increase in capacitance of a storage part (e.g., a memory) required for the liquid crystal display device.

<3. Third Embodiment>

<3.1 Configuration and Data Conversion Processing>

A third embodiment of the present invention is described. An overall configuration and an operations overview are similar to those in the first embodiment; therefore, the description thereof will not be given (see FIG. 2).

Figure 15:
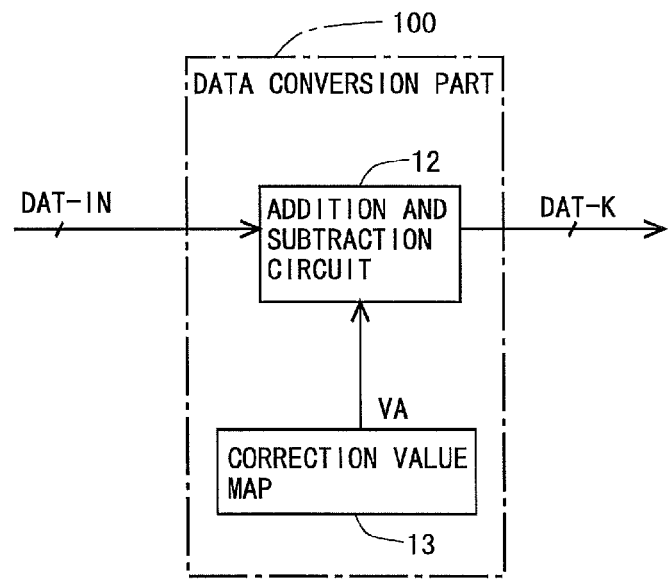
FIG. 15 is a block diagram showing a configuration of a data conversion part in a liquid crystal display device according to a third embodiment of the present invention.

FIG. 15 is a block diagram showing a configuration of a data conversion part 100 in the present embodiment. As shown in FIG. 15, in the present embodiment, the gradation-to-voltage value conversion part 11 and the voltage value-to-gradation conversion part 14 are not provided. In the present embodiment, namely, a gradation (input gradation) of an input image signal DAT-IN is directly subjected to addition/subtraction processing using a correction value VA stored in a correction value map 13.

<3.2 Effects>

According to the present embodiment, a gradation (input gradation) of an input image signal DAT-IN is directly corrected without conversion of a gradation to a voltage value. Therefore, accuracy is lowered in the viewpoint of equalizing optimum counter voltages of all the pixels. However, there is no need to provide constituent elements for data conversion between a gradation and a voltage value, as compared with the constituent elements described in the first embodiment or the second embodiment.

Accordingly, it is possible to obtain an effect of reduction in circuit scale and an effect of reduction in cost.

DESCRIPTION OF REFERENCE CHARACTERS

11: GRADATION-TO-VOLTAGE VALUE CONVERSION PART
12: ADDITION AND SUBTRACTION CIRCUIT
13: CORRECTION VALUE MAP
14: VOLTAGE VALUE-TO-GRADATION CONVERSION PART
15: CORRECTION VALUE CALCULATION PART
21: TIMING CONTROLLER
22: SOURCE DRIVER (VIDEO SIGNAL LINE DRIVE CIRCUIT)
23: GATE DRIVER (SCANNING SIGNAL LINE DRIVE CIRCUIT)
31: TFT (THIN-FILM TRANSISTOR)
32: PIXEL ELECTRODE
33: COMMON ELECTRODE
100: DATA CONVERSION PART
110: GRADATION-TO-VOLTAGE VALUE CONVERSION TABLE (FIRST LOOKUP TABLE)
140: VOLTAGE VALUE-TO-GRADATION CONVERSION TABLE (SECOND LOOKUP TABLE)
200: LIQUID CRYSTAL DRIVE UNIT
300: DISPLAY UNIT
DAT-IN: INPUT IMAGE SIGNAL
DAT-D: DRIVING IMAGE SIGNAL
V1: FIRST VOLTAGE VALUE
V2: SECOND VOLTAGE VALUE
VA: CORRECTION VALUE

The invention claimed is:

1. A liquid crystal display device for displaying an image by applying an alternating-current voltage to a liquid crystal based on an input image signal, the liquid crystal display device comprising:
a display unit including a plurality of video signal lines for transmitting a plurality of video signals, a plurality of scanning signal lines intersecting with the plurality of video signal lines, and a plurality of pixel formation portions including a plurality of switching elements arranged in a matrix form in correspondence with intersections between the plurality of video signal lines and the plurality of scanning signal lines, a plurality of pixel electrodes connected to the plurality of switching elements, and a common electrode disposed to face the plurality of pixel electrodes via the liquid crystal and applied with a predetermined voltage, the plurality of pixel formation portions configured to form pixels;
a gradation correction part including a correction value storage part for storing two kinds of correction values for correcting a first gradation which is a gradation of the input image signal, the correction values including a value used when the liquid crystal is applied with a voltage with positive polarity and a value used when the liquid crystal is applied with a voltage with negative polarity, the gradation correction part configured to obtain a second gradation by correcting the first gradation for each pixel based on the correction value; and
a liquid crystal drive unit configured to drive the liquid crystal by applying the plurality of video signals to the corresponding video signal lines based on the second gradation; wherein
the gradation correction part further includes:
a gradation-to-voltage value conversion part including a first lookup table for converting a gradation to a voltage value, the gradation-to-voltage value conversion part configured to convert the first gradation to a first voltage value based on the first lookup table;
an addition and subtraction part configured to obtain a second voltage value by adding the correction value to the first voltage value or subtracting the correction value from the first voltage value; and
a voltage value-to-gradation conversion part including a second lookup table for converting a voltage value to a gradation, the voltage value-to-gradation conversion part configured to convert the second voltage value to the second gradation based on the second lookup table.

2. The liquid crystal display device according to claim 1, wherein
the correction value storage part stores therein the correction values for all the pixels, and
the addition and subtraction part obtains the second voltage value by adding the correction value stored in the correction value storage part to the first voltage value or subtracting the correction value stored in the correction value storage part from the first voltage value, for all the pixels.

3. The liquid crystal display device according to claim 1, wherein
the correction value storage part stores therein the correction values for some of the pixels,
with regard to the pixel for which the correction value is stored in the correction value storage part, the addition and subtraction part obtains the second voltage value by adding the correction value stored in the correction value storage part to the first voltage value or subtracting the correction value stored in the correction value storage part from the first voltage value, and
with regard to the pixel for which the correction value is not stored in the correction value storage part, the addition and subtraction part obtains the second voltage value by adding a value which is obtained by linear interpolation performed using the correction value for the pixel for which the correction value is stored in the correction value storage part, to the first voltage value or subtracting a value which is obtained by linear interpolation performed using the correction value for the pixel for which the correction value is stored in the correction value storage part, from the first voltage value.

4. The liquid crystal display device according to claim 1, wherein the number of bits of data of the voltage value stored in the first lookup table is larger than the number of bits of data of the gradation stored in the first lookup table.

5. The liquid crystal display device according to claim 1, wherein
the voltage value and the gradation are brought into correspondence with each other for predetermined number of voltage values from among the voltage values to be taken, in the second lookup table, and
with regard to the voltage value for which the data is not stored in the second lookup table, the voltage value-to-gradation conversion part converts the second voltage value to the second gradation by performing linear interpolation using the data of the voltage value for which the data is stored in the second lookup table.

6. The liquid crystal display device according to claim 1, wherein
the gradation correction part makes the correction such that the second gradation becomes smaller than the first gradation at the time when the liquid crystal is applied with the voltage with negative polarity in a case where the gradation correction part makes the correction such that the second gradation becomes larger than the first gradation at the time when the liquid crystal is applied with the voltage with positive polarity, and
the gradation correction part makes the correction such that the second gradation becomes larger than the first gradation at the time when the liquid crystal is applied with the voltage with negative polarity in a case where the gradation correction part makes the correction such that the second gradation becomes smaller than the first gradation at the time when the liquid crystal is applied with the voltage with positive polarity.

7. The liquid crystal display device according to claim 1, wherein the gradation correction part obtains the second gradation by directly adding the correction value to the first gradation or subtracting the correction value from the first gradation.

8. The liquid crystal display device according to claim 1, wherein
a writing period having a length corresponding to one frame period in which a write operation based on the input image signal is performed and a pausing period having a length corresponding to a multiple-frame period in which the write operation based on the input image signal is paused are repeated alternately, and
the operation of the liquid crystal drive unit is stopped in the pausing period.

9. The liquid crystal display device according to claim 1, wherein the switching element is a thin-film transistor made of an oxide semiconductor.

10. The liquid crystal display device according to claim 9, wherein the oxide semiconductor is indium gallium zinc oxide.

11. A method for driving a liquid crystal display device for displaying an image by applying an alternating-current voltage to a liquid crystal based on an input image signal, the liquid crystal display device including a display unit including a plurality of video signal lines for transmitting a plurality of video signals, a plurality of scanning signal lines intersecting with the plurality of video signal lines, and a plurality of pixel formation portions including a plurality of switching elements arranged in a matrix form in correspondence with intersections between the plurality of video signal lines and the plurality of scanning signal lines, a plurality of pixel electrodes connected to the plurality of switching elements, and a common electrode disposed to face the plurality of pixel electrodes via the liquid crystal and applied with a predetermined voltage, the plurality of pixel formation portions configured to form pixels, the method comprising:
a gradation correcting step of obtaining a second gradation by correcting a first gradation which is a gradation of the input image signal, for each pixel; and
a liquid crystal driving step of driving the liquid crystal by applying the plurality of video signals to the corresponding video signal lines based on the second gradation, wherein
the liquid crystal display device includes a correction value storage part for storing two kinds of correction values for correcting the first gradation, the correction values including a value used when the liquid crystal is applied with a voltage with positive polarity and a value used when the liquid crystal is applied with a voltage with negative polarity,
in the gradation correcting step, the second gradation is obtained by correcting the first gradation based on the correction value stored in the correction value storage part, and
the gradation correction step further includes:
a gradation-to-voltage value conversion step of converting the first gradation to a first voltage value based on a first lookup table for converting a gradation to a voltage value;
an addition and subtraction step of obtaining a second voltage value by adding the correction value to the first voltage value or subtracting the correction value from the first voltage value; and
a voltage value-to-gradation conversion step of converting the second voltage value to the second gradation based on a second lookup table for converting a voltage value to a gradation.

* * * * *